US008373387B2

(12) United States Patent
Bourilkov et al.

(10) Patent No.: US 8,373,387 B2
(45) Date of Patent: Feb. 12, 2013

(54) USB INDUCTIVE CHARGER

(75) Inventors: Jordan T. Bourilkov, Stamford, CT (US); David T. Biedermann, Easton, CT (US); David N. Klein, Southbury, CT (US)

(73) Assignee: The Gillette Company, Boston, MA (US)

( * ) Notice: Subject to any disclaimer, the term of this patent is extended or adjusted under 35 U.S.C. 154(b) by 350 days.

(21) Appl. No.: 12/849,777

(22) Filed: Aug. 3, 2010

(65) Prior Publication Data

US 2012/0032631 A1 Feb. 9, 2012

(51) Int. Cl.
*H02J 7/00* (2006.01)

(52) U.S. Cl. ........................................ 320/108; 320/107

(58) Field of Classification Search .................. 320/107, 320/108; 455/41.1, 343.1–343.6, 573; 340/538.16, 340/854.6, 854.8, 870.31
See application file for complete search history.

(56) References Cited

U.S. PATENT DOCUMENTS 5,734,254 A 3/1998 Stephens
7,375,494 B2 * 5/2008 Daniel et al. .................. 320/112
7,495,414 B2 2/2009 Hui
7,576,514 B2 8/2009 Hui
8,098,043 B2 * 1/2012 Lin ............................... 320/108
8,310,200 B2 * 11/2012 Matouka et al. .............. 320/108
2010/0013431 A1 1/2010 Liu
2010/0057224 A1 3/2010 Rojo
2011/0084660 A1 * 4/2011 McSweyn ..................... 320/111

OTHER PUBLICATIONS

Financial Times, "Just relax and recharge" by Paul Taylor, Oct. 23, 2009, http://www.ft.com/cms/s/0/60518aee-bf6c-11de-a696-00144feab49a.html.

Technology Marketing Corporation, "4G Wireless Evolution-Powermat Unveils Wireless—Energy Products at CES" by Jyothi Shanbhag, Jan. 9, 2009, http://4g-wirelessevolution.tmcnet.com/topics/4g-wirelessevolution/articles/48428-powermat-unveils- wireless-energy-products-ces.htm.

The ToyBox, "How the cordless Powermat charging system took my iPod touch hostage [review]" by Andrew Nusca, Oct. 15, 2009, http://www.zdnet.com/blog/gadgetreviews how-the-cordless-powermat-charging-system-took-my-ipod-touch-hostage-review. 8536.

WiPower, Inc., Wireless Charging System, Mar. 2008, University of Florida, Office of Technology Licensing http://www.research.ufl.edu/otl/pdf/startup/WiPower.pdf.

AOL, Inc., "WiPower touts breakthrough in wireless power" by Donald Melanson, Sep. 24, 2007, http://www.engadget.com/2007/09/24/wipower-touts-breakthrough-in-wireless-power/.

Gadgetell—Tech News, Reviews, and Interesting Things, "Meet the new Palm Pre TouchStone" by JG Mason, Jan. 8, 2009, http://www.gadgetell.com/tech/comment/meet-the-new-palm-touchstone/.

PCT International Search Report with Written Opinion in corresponding Int'l application PCT/US2011/046089 (11 pgs).

* cited by examiner

*Primary Examiner* — Richard V Muralidar

(74) *Attorney, Agent, or Firm* — Kevin C. Johnson; Steven W. Miller

(57) ABSTRACT

An inductive charger adapter element includes a housing, a coil comprising electrically conductive material, the coil contained within the housing, the coil configured to inductively couple to an external primary coil; and a connector supported on the housing, the connector coupled to the coil and configured to couple the inductive charger adapter element to a port provided on a device, the connector including a first pair of conductors for providing power and charging current to a battery in the device.

7 Claims, 6 Drawing Sheets

USB INDUCTIVE CHARGER

BACKGROUND

Modern portable electronic devices such as mobile phones, handheld computers, and portable audio/video players are usually powered by batteries. Rechargeable batteries are often used to supply power to such devices. Rechargeable batteries can be charged from various sources including an AC source, e.g. using an AC/DC charger, or in a car, e.g. DC/DC charger plugged in the Cigarette Lighter Adapter (CLA), or using a portable charger. Recently, inductive chargers have been developed to charge rechargeable batteries in portable devices. Examples of such inductive chargers include systems such as Splashpower™, eCoupled™, Powermat™, WiPower™ and to PowerbyProxi™.

Inductive charging systems use a charging pad (having one or more primary or transmitter coils) on which the devices to be charged are placed on the pad. The devices to be charged are equipped with custom-made receivers, such as skins equipped with receiver inductive coils that are specific to the device. Such device-specific systems typically require acceptance by the original equipment manufacturer (OEM). Devices not equipped with custom-made receivers can be connected by a wire to an external receiver unit placed on the pad. Such an approach however, minimizes the benefits of inductive charging.

SUMMARY

According to an aspect of the present invention, an inductive charger adapter element includes a housing, a coil comprising electrically conductive material, the coil contained within the housing, the coil configured to inductively couple to an external primary coil; and a connector supported on the housing, the connector coupled to the coil and configured to couple the inductive charger adapter element to a port provided on a device, the connector including a first pair of conductors for providing power and charging current to a battery in the device.

According to a further aspect of the present invention, an inductive data transfer system includes a receiving module including a housing and a coil disposed in the housing. The receiving module also includes a connector supported on the housing and coupled to the coil, the connector configured to couple the receiving module to a port provided on a device, the connector including a first pair of conductors for providing a charging current for a battery in the device and at least a second conductor configured to transfer data between the receiving module and the device. The system also includes a transmitting module including a primary coil and an port coupled to the primary coil, the port comprising a third conductor to receive current from an external power source, and a fourth conductor to receive data from an external data source, with the charging current provided from inductive power transfer from the primary coil to the coil in the housing and the data transfer is provided from an inductive transfer of the data between the primary coil and the coil in the housing.

According to a further aspect of the present invention, an inductive data transfer device includes a pad housing a primary coil and a first port coupled to the primary coil, the first port comprising a conductor to receive current from an external power source; and a data transfer port coupled to the primary coil, the data transfer port to receive data from an external data source.

DETAILED DESCRIPTION

Figure 1:
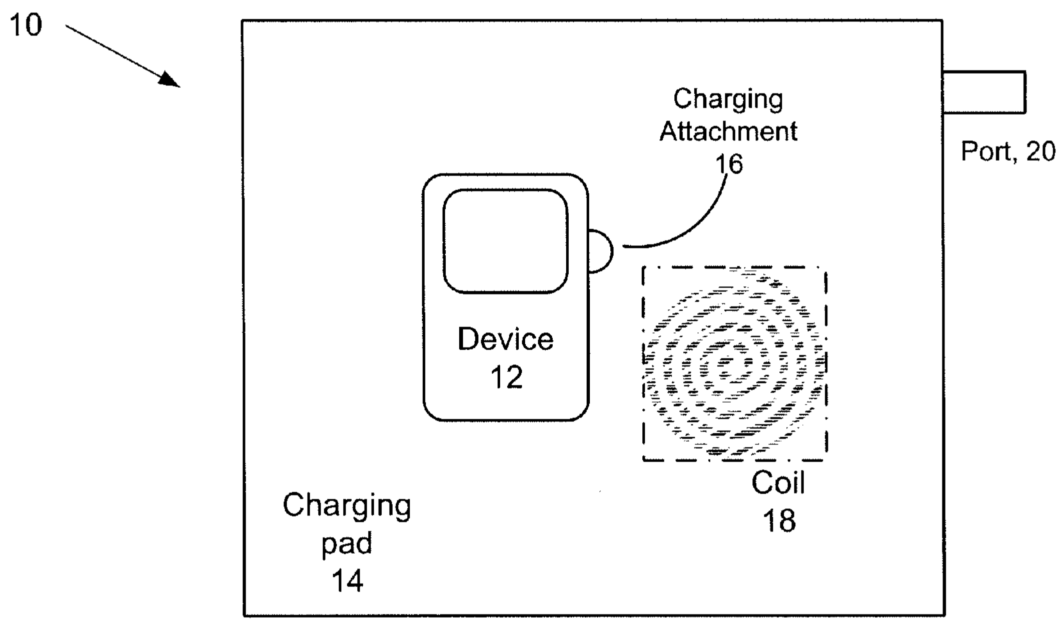
FIG. 1 is a diagrammatical plan view of an inductive charging system.

Referring to FIG. 1, an inductive charging system 10 is shown. The system 10 accommodates a device 12 that is placed on a charging pad 14. Rechargeable batteries in the device 12 are charged from the charging pad 14 using a charging attachment 16. In general, the charging attachment 16 is a device that connects to the device 12 through a port (not numbered) provided on the device 12. For example, the charging attachment 16 can connect to the device 12 using a universal serial bus (USB) port such as a micro-USB port or a mini-USB port. In some implementations, other ports can also be used to connect the charging attachment 16 to the device 12 including, without limitation, USB-A, USB-B, Firewire (IEE 1394), DC Power Jacks, and proprietary connectors such as ones used by Motorola, Apple, Samsung etc. The charging attachment 16 is provided with a suitable connector based on the port that the attachment 16 connects to.

The port on the device 12 that the charging attachment 16 connects to, is configured to power the device and also to charge one or more rechargeable batteries that power the device 12. The circuit between port 16 and the one or more rechargeable batteries can provide charge control. In some implementations, a charging circuit is embedded with and/or coupled to the rechargeable batteries. In some cases, the charging circuit can be configured to accept charging input from the charging pad 14 via the charging attachment 16. In some implementations, the charging attachment 16 can be configured with a "pass-through" option to provide the same input connector as the device before the adapter was plugged-in. This option is useful to allow data exchange or connect external power attachments such as a car cigarette lighter adapter/charger (CLA).

In some implementations, the charging circuit can include a charge controller circuit configured to monitor the charging current for different types of rechargeable batteries and battery packs, including, for example, cylindrical batteries, prismatic batteries, and button-cell batteries. The charging circuit can also be configured to provide functionalities such as over-charge protection and temperature monitoring.

The charging pad 14 receives power from an external source (such as a wall outlet or a portable power source) via a port 20 and inductively transfers the power to rechargeable batteries via the charging attachment 16. The charging pad 14 can be a portable entity or an entity embedded into a larger unit. For example, in some implementations, the charging pad can be a part of a furniture such as a table. In such cases, the device 12 may simply be placed on a portion of the furniture in order to be charged.

In some implementations, the charging pad 14 can include one or more coils 18 that serve as the primary coils in the inductive charging system. It should be noted that the coil 18 depicted in FIG. 1 is typically contained within the body of the charging pad. In general the coil 18 is embedded below the top surface of the charging pad 14. The coil 18 is powered by a power supply connected to the charging pad and the power is inductively transferred to the charging attachment 16 via coupling between the primary coil 18 and a secondary coil within the charging attachment 16. The charging pad 14 can include one or more coils 18. For example, the charging pad 14 can include one large coil such that the receiving coil in the charging attachment 16 couples with the coil 18 when placed anywhere on the charging pad, in some implementations, multiple coils 18 can be distributed within the charging pad 14. In general, the coil 18 is an electromagnetic coil including, for example, a flat coil (e.g. printed circuit or flex circuit), a spool coil or a solenoid. Typically, the coil 18 is formed by winding a conductor, such as an electrical wire or a multiple core Litz wire that is used to carry high frequency alternating current, around a core of magnetic material or a non-magnetic material (e.g., air). When a current is passed through the windings of a coil 18, a magnetic field that develops extends through the center of the coil 18 along its longitudinal axis and circles back around the outside of the loop or coil. The magnetic field circling each loop or winding of wire combines with the fields from the other loops to produce a concentrated field down the center of the coil 18. The strength of a coil's magnetic field can be controlled by controlling the introduced current, the number of loops or windings of the coil, and other parameters and characteristics associated with the coil 18. In general, the magnetic flux induced in the coil 18 is changed (for example using an alternating current) to induce a voltage in the receiver coil within the charging attachment 16.

The device 12 can simply be placed on the charging pad 14 in order for it to be charged. In some implementations, the device 12 is placed at a certain orientation or position for efficient coupling between the receiver coil and the coil 18 of the charging pad 14. For example, the device 12 may be placed on the charging pad 14 in a way such that the receiving coil in the attached charging attachment 16 is at a proximity of less than, e.g., about 1 inch from the coil 18. In some implementations, multiple devices 12 (each with a separate charging attachment 16) can be placed on the charging pad 14 simultaneously.

The one or more rechargeable batteries charged using the charging attachment 16 can be a combination of one or more rechargeable electro-chemical units or cells. If multiple cells are present in a rechargeable battery, the cells can be connected with each other in series or in parallel. In general, a battery (or cell) can include: i) an anode or negative electrode—the reducing or fuel electrode—that gives up electrons to the external circuit and is oxidized during an electrochemical reaction, ii) a cathode or positive electrode—the oxidizing electrode—that accepts electrons from the external circuit and is reduced during the electrochemical reaction, and iii) an electrolyte—the ionic conductor—that provides the medium for transfer of charge, as ions, inside the cell between the anode and cathode. The electrolyte is typically a liquid, such as water or other solvents, with dissolved salts, acids, or alkalis to impart ionic conductivity. In some implementations, the battery can include solid or gaseous electrolytes, that are ionic conductors at the operating temperature of the cell. In some implementations, the rechargeable battery, can include Li-Ion cells having graphitic anode material or Lithium Titanate anode material, and Lithiated-Iron-Phosphate cathode materials adapted to enable fast recharge of rechargeable batteries based on such materials. In general, the battery is a storage device for electric energy and is known also as a "storage battery" or "accumulator."

The device 12 can be any electronic or electrical device that uses a rechargeable battery. For example, the device 12 can include, without limitation, a mobile phone or a smart phone, a GPS device, an electric shaver, an electric toothbrush, a Personal Digital Assistant (PDA), a digital camera, a picture viewer, an audio device, a laptop computer, and a multimedia device such as an iPod®.

Figure 2:
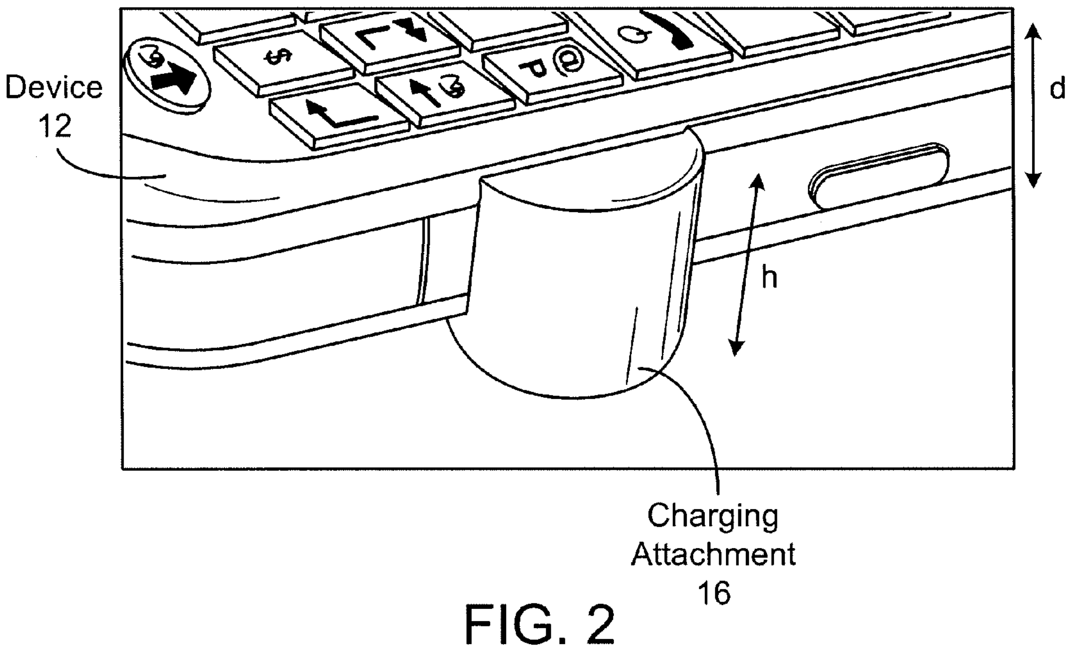
FIG. 2 is a pictorial view of a charging attachment.

Referring to FIG. 2, an exemplary connection of a charging attachment 16 with a device 12 is shown. In this example, the charging attachment 16 is connected to the device 12 via a micro-USB port (not shown) at the side of the device 12. Even though the example in FIG. 2 depicts the height h of the charging attachment 16 to be substantially same as the depth d of the device 12, this should not be considered limiting. The dimensions of the charging attachment 16 can in general be independent of the device 12. In fact, the same charging attachment 16 can be used on multiple devices 12 (of possibly varying dimensions) having appropriate connecting ports.

Figure 3A:
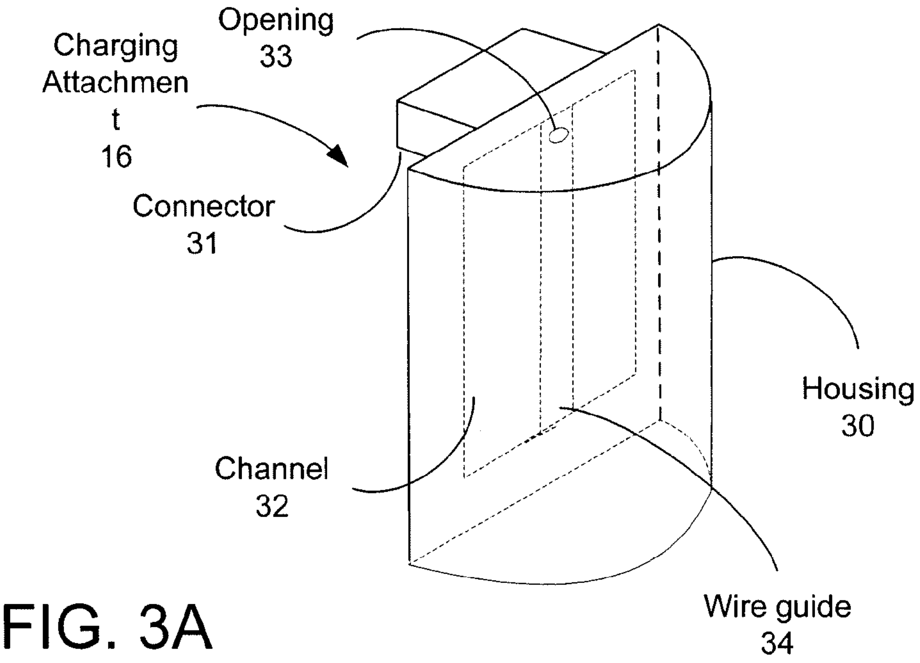
FIGS. 3A and 3B are perspective and lateral views, respectively, of the charging attachment.

Referring now to FIG. 3A, a schematic diagram shows a perspective view of an exemplary charging attachment 16. In brief overview the charging attachment 16 includes a housing 30 and a connector 31 configured to couple circuitry within the housing to a port of a device. The housing 30 can be of any shape and size that accommodates the circuitry within. In this example, the housing 30 is shown to be a semi-circular cylinder. In some implementations, the housing 30 can have other shapes such as, for example, cylindrical, cubic, flat or a rectangular solid.

In some cases, the housing 30 is a thin patch or sticker that can be attached to the back of a device 12. The thin patch or sticker is equipped with an appropriate connector 31 to attach to a port (e.g. a mini or micro USB) on the device 12. In general, the body 30 has sufficient magnetic permeability to allow efficient magnetic coupling between the coil 18 of the charging pad 14 and the receiving coil housed within the body 30. For example, the body 30 may be constructed from a non-conductive or non magnetic material such as plastic, PCBA, Teflon etc.

The connector 31 is provided in accordance with the port of the device 12 that the charging attachment 16 connects to. For example, if the charging attachment 16 connects to a micro-USB port on the device 12, the connector 31 is a suitable micro-USB plug. In some implementations, the charging attachment 16 may be provided with multiple interchangeable connectors (e.g. micro-USB, mini-USB, DC Jack etc.) that can be changed in accordance with the charging port of the device 12. In general, the connector 31 will provide one or more connections between the charging attachment 16 and a device 12 that the charging attachment is attached to. In some implementations, the one or more connections in the connector 31 allows multiple functionalities (sometimes in parallel) such as charging and data transfer. Such multiple functionalities can allow data transfer (such as via a USB port) during charging a device 12. In such cases, a data input port (for example a USB port) can be provided on the charging pad 14 and data can be inductively transferred to the device 12 via the charging attachment 16, sometimes concurrently with the charging power. In some implementations, such parallel transfer of data and power can be achieved, for example, by modulating the power signal, or by transmitting the data at a different frequency than the power signal. For example, the power transfer can operate in the range of 100 kHz to 500 kHz, and the data communication can be done in radio frequency range. i.e. in the range of 10 MHz to 10 GHz. In some implementations, a data source, for example a computing device or memory device can be connected to the charging pad while the device 12 is inductively charged with communications enabled. In some implementations, the charging pad 14 can include memory to at least temporarily store data to be transferred to the device 12.

In general, the connector 31 is not symmetrical and an orientation of the charging attachment 16, when attached to a device 12, can depend on the orientation of the respective port on the device 102. For example, a mini-USB (or a micro-USB) port has a different width at the top than at the bottom and in general, the port can be provided in a device oriented up or down. In such cases, the orientation of the housing 30 with respect to the device 12 depends on the orientation of the port. However, in some cases, it may be desirable to have one portion of the housing 30 (for example, the side closer to the receiving coil) closer to the charging pad 14. In some implementations, this can be achieved by configuring the charging attachment 16 to be symmetrical and/or reversible, allowing one end of the attachment 16 to be close to the charging pad 14 regardless of the orientation of the port on the device 12. The charging attachment 16 can be made reversible, for example, by mechanically enabling the connector 31 to be rotated to a desired orientation.

In some implementations, a location of the connector 31 on the charging attachment 16 can be made adjustable. For example, the connector 31 can be configured to move up and down along a channel 32. Such an arrangement allows for suitable positioning of a portion of the housing. For example, the connector 31 can be positioned such that the bottom of the housing 30 is aligned with the surface of the device 12 in contact with the charging pad 14. The connector 31 can also be positioned such that the coil side of the housing 30 is as close as possible to the charging pad 14. In some implementations, the channel 32 for moving the connector 31 can be provided in conjunction with the functionality of rotating or reversing or replacing the connector 31.

In some implementations, the charging attachment 16 includes an opening 33 between the connector 31 and the housing 30. The opening 33 allows for wires, between the connector 31 and the circuitry within the housing 30, to pass through and move when the connector 31 is rotated and/or moved along the channel 32. In some implementations, the charging attachment 16 includes a printed circuit board (PCB) mounted on the back of a mini USB or micro-USB connector. In such cases, the PCB carries the receiver circuit (rectifier, voltage converter etc.) and connects via brushes to two vertical conductive power rails. In this way, the connector/PCB assembly can slide up and down to adjust the power adapter to an optimal position on the side of the device. In some implementations, the charging attachment 16 also includes a wire guide 34 that houses and guides the wires as the connector 31 is moved along the channel 32. In some implementations, the connector 31 can be moved along the channel 32 as well as rotated or reversed.

Figure 3B:
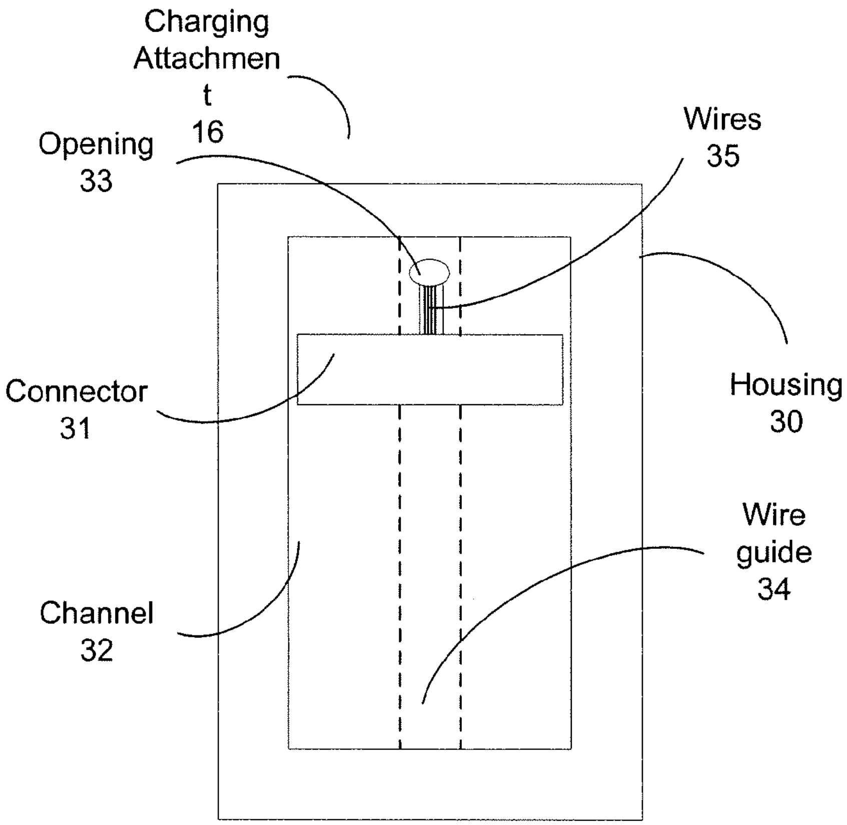

Referring now to FIG. 3B, a schematic diagram shows a lateral view (from the connector side) of an exemplary charging attachment 16. The wire guide 34 is concealed in this view and shown using dotted lines. In some implementations, the wires 35 connecting the connector 31 with the circuitry within the housing 30 passes through the opening 33. In some implementations, the wires 35 may be grouped together in the form of a bus.

Figure 4:
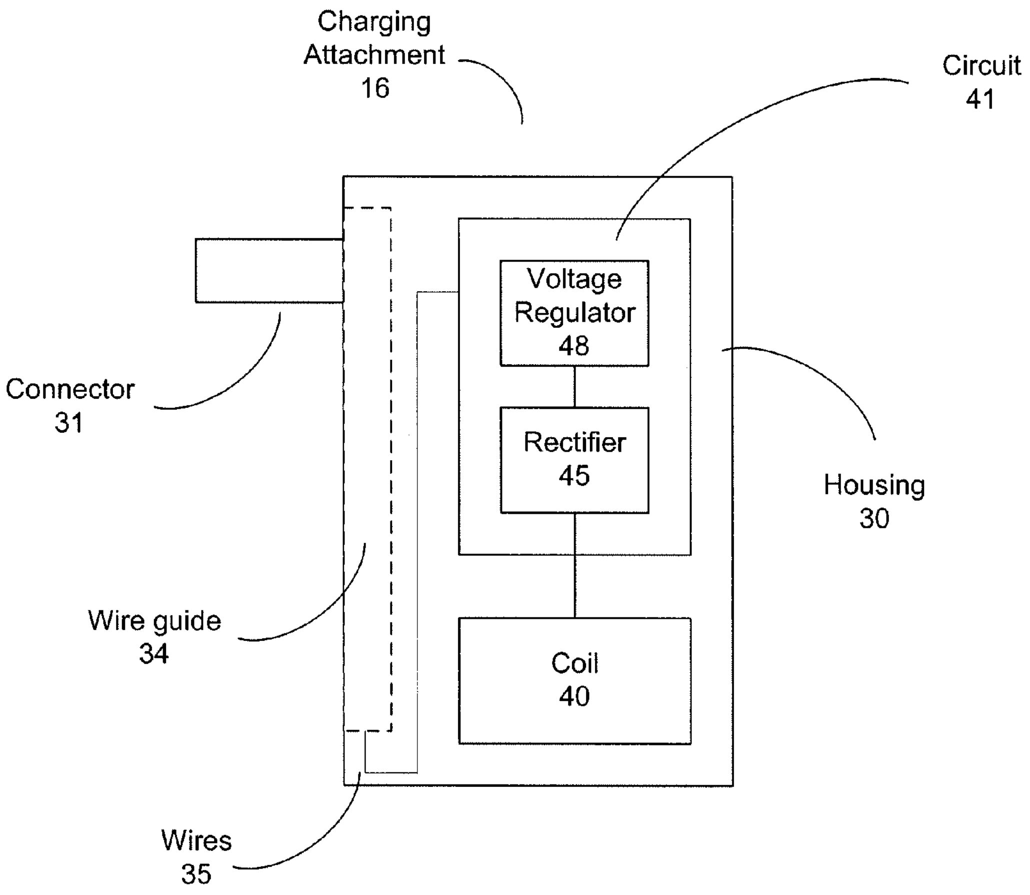
FIG. 4 is a schematic block diagram showing components in an exemplary charging attachment.

Referring to FIG. 4, a schematic block diagram shows the internal structure of an exemplary charging attachment 16. In brief overview, the charging attachment 16 includes a coil 40 and a circuit 41. The coil 40 is the receiving coil that couples with one or more primary coils 18 described with reference to FIG. 1.

Figure 5A:
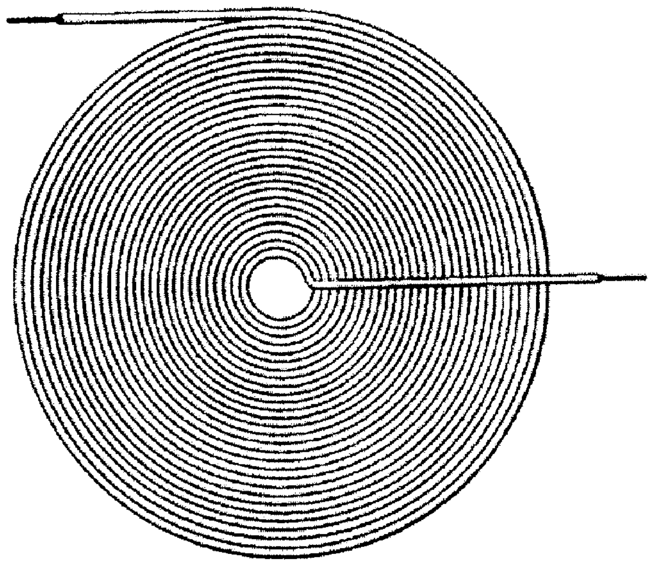
FIGS. 5A and B are views of exemplary coil structures for the charging attachment.
Figure 5B:
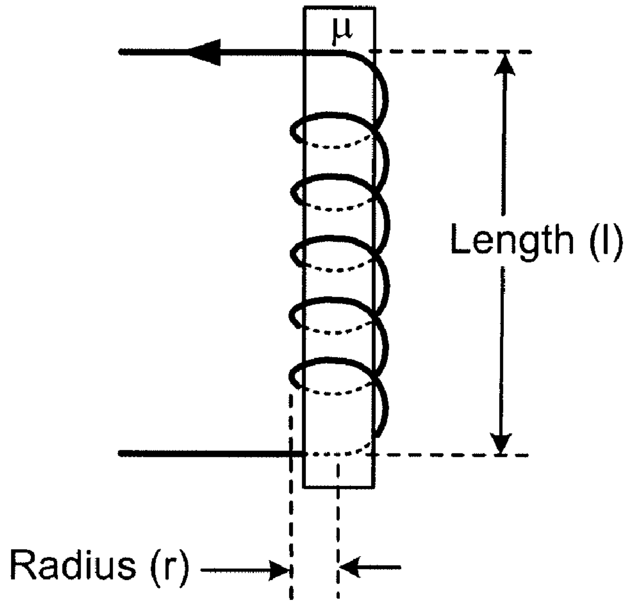

In some implementations, the coil 40 is a flat coil such as shown in FIG. 5A. In case of flat coils, the turns or windings of a wire are essentially on the same plane and the height of the coil is very small as compared to the diameter of the coil. In other implementations, the coil 40 is a spool coil such as shown in FIG. 5B. In case of a spool coil, the coil 40 is wound around a core (of radius r) of magnetic or non-magnetic material (e.g., a ferrite) that may be characterized by a magnetic permeability $\mu$. In general, the axis of the spool coil is parallel to the length/and perpendicular to the surface 14. In some implementations, the length/of the coil is just less than a typical portable device thickness (such as a mobile phone or a smart phone). In general, a spool coil is oriented vertically when the device the charging attachment 106 is attached to is laid on a flat surface such as the surface of the charging pad 104.

The charging attachment 16 also includes a circuit 41 that receives the current induced in the coil 40 and supplies it to the device and the rechargeable batteries through the connector 31. The circuit 41 can include, for example, a rectifier 45 and a voltage regulator 48. In some implementations, the rectifier 45 is configured to convert an alternating current (AC or RF) input to the circuit 41 to direct current (DC). The direct current output from the rectifier 45 can then be fed to a DC/DC voltage regulator 48. The rectifier 45 can be a half wave rectifier or a full wave rectifier, and can include components such as diodes, resistors and capacitors.

The voltage regulator 48 can accept a range of input voltages from the rectifier 45 and provide a desired charging voltage. In general, the voltage regulator 48 is a DC/DC converter that provides a regulated output voltage. For example, in some implementations, the voltage regulator 48 can provide a 5V USB output. In some implementations, the voltage regulator 48 may provide a stepped-up voltage level, a stepped-down voltage level or a regulated voltage of approximately the same level. The current level at the output of the voltage regulator 48 may vary depending on various factors such as system design and quality of inductive link between the coils in the charging pad 14 and the charging attachment 16, respectively. For example, when producing a 5V output, the current (which is also the charging current) may vary between 0.1 A and 1.5 A. In some implementations, the voltage regulator 48 can include a constant current regulator circuit or current limiting circuit to meet the USB specification requirements.

The circuit 41 can also include other components, such as components for transferring data inductively received from the charging pad 14. In some implementations, the data can be demodulated from the power signal or received by a separate coil at a different frequency. In some implementations, the demodulated digital data is converted to USB D+ and D− signal and fed to the corresponding pins of the micro-USB connector. Additional resistors or voltage dividers can be included in the circuit 41 to enable specific devices to accept charge at a desired rate via their charging connectors, e.g. a resistor of a predetermined value between two particular pins.

In some implementations, a 'pass-through' option can be implemented to allow access to the USB port of the device without removing the charging attachment 16. For example, when an induction charger is not available (e.g. in a car), the USB port may be needed for some other connection. In some implementations; an additional female connector (e.g. a female micro or mini USB connector) can be attached to the back of the charging attachment 16 such that the female connector is coupled to the connector 31 of the charging attachment 16.

Figure 6:
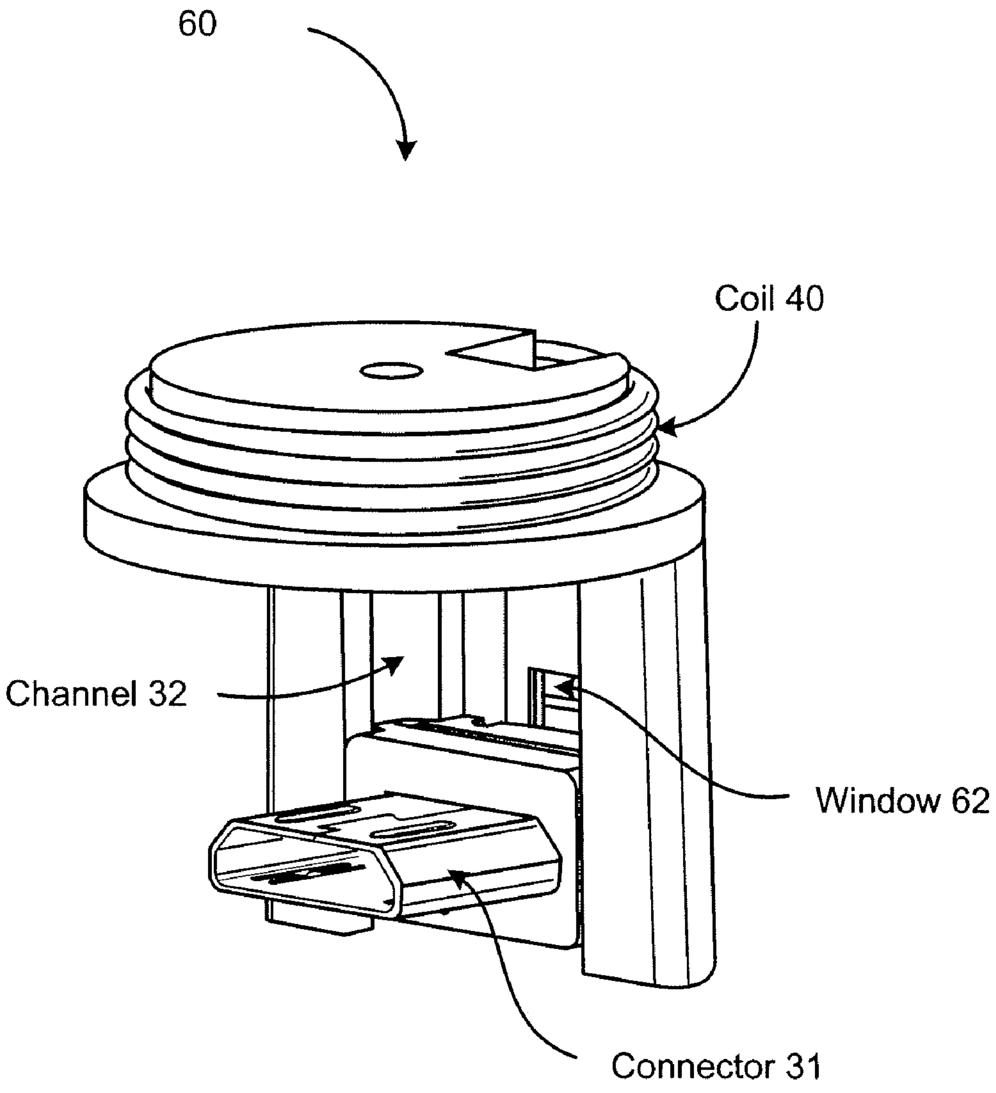
FIG. 6 is a perspective view of an example of a charging attachment.

FIG. 6 shows a perspective view of an example of a charging attachment 60. When connected to a device, the coil 40 is usually facing downwards since such an orientation allows the coil to be most proximate with an inductive charging pad. The connector 31 can slide along the channel 32 such that the charging attachment 60 can fit a wide variety of devices of varying thickness. In some implementation, the charging attachment 60 can also have a window 62 that can serve as a receptacle for another connector (not shown) connecting to the charging attachment 60. The connector 31 can be provided with a female port at the back to accept such a connection. In such cases, the connector 31 can be moved along the channel 32 to a position where the female port aligns with the window 62 thereby allowing the charging attachment 60 to function as a "pass through" port. In such cases, the port on the device can be used without removing the charging attachment from the port. In some implementations, a port conversion may also be implemented on the charging attachment 60. For example, the female port provided on the back of the connector 31 can be a micro USB port while the connector 31 itself is a mini USB connector. In such cases, the charging attachment 6 includes circuitry to map a first type of port to a second type of connector.

Other embodiments are within the scope of the following claims.

What is claimed is:

1. An inductive charger adapter element comprising:

a housing, a coil comprising electrically conductive material, the coil contained within the housing, the coil configured to inductively couple to an external primary coil; and a connector supported on the housing, the connector coupled to the coil and configured to couple the inductive charger adapter element to a port provided on a device, the connector including a first pair of conductors for providing power and charging current to a battery in the device, a pair of brushes, and a pair of conductive rails over which the connector is configured to move with each of the rails being connected to a circuit via a corresponding one of the brushes wherein the connector is adjusted such that the conductor coil in the housing is within a predetermined distance from the external primary coil.

2. The element of claim 1 further comprising at least a second conductor within the connector, the second conductor configured to transfer data between the inductive charger and the device.

3. The element of claim 1, further comprising:

the circuit coupled to the coil, the circuit comprising:

a rectifier, and a voltage converter to convert an input voltage to the circuit to a constant charging voltage.

4. The element of claim 1, wherein the connector comprises a universal serial bus (USB) plug.

5. The element of claim 4, wherein the USB plug is one of a mini-USB plug and a micro-USB plug.

6. The element of claim 1, wherein the coil is one of a flat coil and a spool coil.

7. The element of claim 1, wherein the predetermined distance is less than about 1 inch.

* * * * *